United States Patent [19]

Kondo et al.

[11] Patent Number: 4,535,109

[45] Date of Patent: Aug. 13, 1985

[54] METHOD FOR PRODUCING SILICONE AQUEOUS EMULSION COMPOSITIONS

[75] Inventors: Hidetoshi Kondo, Ichihara; Taro Koshii, Chiba, both of Japan

[73] Assignee: Toray Silicone Company, Ltd., Tokyo, Japan

[21] Appl. No.: 653,174

[22] Filed: Sep. 24, 1984

[30] Foreign Application Priority Data

Oct. 31, 1983 [JP] Japan ................. 58-204482

[51] Int. Cl.$^3$ ............................................. C08K 3/36
[52] U.S. Cl. ................................. 524/188; 524/588; 524/714; 524/837; 524/838; 524/863; 524/864
[58] Field of Search ............. 524/588, 188, 837, 838, 524/714, 863, 864

[56] References Cited

U.S. PATENT DOCUMENTS

| | | | |
|---|---|---|---|
| 3,004,871 | 10/1961 | Leavitt | 117/143 |
| 4,221,688 | 9/1980 | Johnson et al. | 260/29.2 M |
| 4,228,054 | 10/1980 | Ona et al. | 260/29.2 M |
| 4,248,751 | 2/1981 | Willing | 260/29.2 M |
| 4,427,811 | 1/1984 | Elias et al. | 524/588 |
| 4,496,687 | 1/1985 | Okada et al. | 524/588 |

FOREIGN PATENT DOCUMENTS

| | | | |
|---|---|---|---|
| 664097 | 5/1963 | Canada | 524/864 |
| 57-57063 | 12/1982 | Japan . | |
| 58-69250 | 4/1983 | Japan . | |

*Primary Examiner*—Lewis T. Jacobs
*Attorney, Agent, or Firm*—Edward C. Elliott

[57] ABSTRACT

Described is a method of producing silicone aqueous emulsion compositions which cure at room temperature by the removal of water to form elastomeric coatings or films with superior surface gloss, good adhesion to substrates, and rustproofness. The method prepares an emulsion of polydiorganosiloxane having at least two hydroxyl groups per molecule, colloidal silica or alkali metal silicate, curing catalyst, emulsifier, and water, the emulsion having a pH of from 9 to 12. After a period of ripening for a period of time, so that an elastomeric material will be formed when water is removed at room temperature, an amino-functional silane or its partial hydrolyzate is added to give the emulsion its improved properties.

6 Claims, No Drawings

METHOD FOR PRODUCING SILICONE AQUEOUS EMULSION COMPOSITIONS

BACKGROUND OF THE INVENTION

1. Field of the Invention

This invention relates to a method of producing silicone aqueous emulsion compositions having improved adhesion and gloss.

2. Background Information

Due to the superior water repellency, weather resistance and rubbery elasticity of silicones, many silicone aqueous emulsion compositions which form elastomeric materials by the removal of water have been proposed or provided for fiber and paper treatment and for waterproof film-forming materials for concrete, wood, slate, etc.

For example, U.S. Pat. No. 3,004,871, issued Oct. 7, 1961, proposes a composition consisting of a hydroxyl group-terminated diorganopolysiloxane, an organohydrogen polysiloxane, a polyalkylsilicate and an aliphatic acid tin salt. Japanese Patent No. 57-57063 [82-57063] proposes a composition consisting of a hydroxyl group-terminated diorganopolysiloxane, a trifunctional or higher functional silane and an aliphatic acid tin salt. U.S. Pat. No. 4,221,688, issued Sept. 9, 1980, proposes a composition consisting of a hydroxyl group-terminated diorganopolysiloxane, colloidal silica and an aliphatic acid tin salt. U.S. Pat. No. 4,248,751, issued Feb. 3, 1981, proposes a composition consisting of a vinyl-terminated diorganopolysiloxane, an organopolysiloxane containing Si-H groups and a platinum compound U.S. Pat. No. 4,228,054, issued Oct. 14, 1980, proposes a composition obtained from the emulsion polymerization of a cyclic organopolysiloxane and a functionalized organoalkoxysilane.

However, these silicone aqueous emulsion compositions have the drawbacks of a lack of adhesion or of rusting when applied to the metals used in construction, machinery and electrical appliances. As a method for imparting adhesion to silicone aqueous emulsion compositions, Japanese Kokai Patent No. 58-69250 [83-69250] proposes the addition of an amino-functional silane. However, the manufacturing process is overly complicated since it requires the repeated addition of small amounts of the amino-functional silane to a colloidal silica with mixing to homogeneity in order to avoid gelation of the emulsion composition upon the addition of the amino-functional silane. This composition also has the drawback of an inferior surface gloss which degrades the appearance when it is used as a coating agent.

The inventors conducted extensive research to resolve these drawbacks. As a result, the inventors discovered a method for producing a silicone aqueous emulsion composition that would cure at room temperature with the removal of water to form an elastomeric material with a superior surface gloss, good adhesion and good rustproofness.

SUMMARY OF THE INVENTION

This invention concerns a method of producing silicone aqueous emulsion compositions which cure at room temperature by the removal of water to form an elastomeric material with a superior surface gloss, good adhesion to substrates, and good rustproofness of metallic substrates coated by the emulsion composition.

It is an object of the method of this invention to produce silicone aqueous emulsion compositions which have superior gloss when coated on a substrate and dried.

It is an object of the method of this invention to produce silicone aqueous emulsion compositions which have good adhesion to substrates upon which they are coated and dried.

It is an object of the method of this invention to produce silicone aqueous emulsion compositions which provide a rustproof coating over substrates upon which they are coated and dried.

It is an object of this invention to disclose a method of producing silicone aqueous emulsion compositions having the above desirable features in a simple manner.

DESCRIPTION OF THE INVENTION

This invention concerns a method for producing silicone aqueous emulsion compositions consisting essentially of (1) adjusting a base emulsion composition which consists essentially of (A) 100 parts by weight of a polydiorganosiloxane which contains at least 2 silicon-bonded hydroxyl groups per molecule, the organic groups being monovalent halogenated hydrocarbon radicals or monovalent hydrocarbon radicals, (B) from 1 to 150 parts by weight colloidal silica or from 0.3 to 30 parts by weight alkali metal silicate, (C) from 0.01 to 10 parts by weight of a curing catalyst, said catalyst being a metal salt of an organic acid, (D) from 2 to 30 parts by weight emulsifier, and (E) water to a pH of from 9 to 12, (2) ripening at a temperature of from 10° to 95° C. for a sufficient period of time that an elastomeric material will be formed when water is removed at room temperature, and (3) adding (F) from 0.5 to 30 parts by weight of an amino-functional silane of the formula

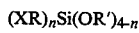

$$(XR)_n Si(OR')_{4-n}$$

where X is an amino-functional radical, R is a divalent hydrocarbon radical containing no more than 8 carbon atoms, R' is a monovalent hydrocarbon radical containing less than 7 carbon atoms or is selected from the group consisting of $-CH_2OC_2H_5$ or $-CH_2CH_2OCH_3$, and n is 1, 2, or 3 or its partial hydrolysis condensate.

The polydiorganosiloxane comprising component (A) imparts the character of an elastic substance to the product obtained by removing water from the emulsion. This polydiorganosiloxane must contain at least 2 silicon-bonded hydroxyl groups per molecule and there is no specific restriction on the position of hydroxyl group substitution. Aside from the silicon-bonded hydroxyl groups, the organic groups can be either monovalent hydrocarbon radicals or halogenated monovalent hydrocarbon radicals e.g., alkyl radicals such as methyl, ethyl, propyl and butyl; alkenyl radicals such as vinyl and allyl; aryl radicals such as phenyl; aralkyl radicals such as benzyl; alkaryl radicals such as styryl and tolyl; cycloalkyl radicals such as cyclohexyl and cyclopentyl; or the above radicals in which some or all of the hydrogen atoms have been substituted by a halogen such as fluorine, chlorine or bromine such as 3,3,3-trifluoropropyl, etc. This organic group is usually methyl, vinyl or phenyl. It is not necessary that all organic radicals be identical and generally a combination of organic radicals is present. The molecular configuration may be either linear or branched. While there is no specific restriction on the molecular weight, a molecular weight of 5000 or greater is preferable. An appropriate tensile strength can be obtained at a molecular weight of 30,000 or greater. The most favorable tensile strength and elongation can be obtained at a molecular weight of 50,000 or greater. Practical examples of this polydiorganosiloxane are hydroxyl group-terminated dimethylpolysiloxanes, methylphenylpolysiloxanes, methylvinylpolysiloxanes or copolymers of dimethylsiloxane units and methylvinylsiloxane units, etc. These polydiorganosiloxanes can be synthesized by the ring-opening polymerization of cyclic siloxanes or by the hydrolysis of linear or branched polydiorganosiloxanes which contain hydrolyzable groups such as the alkoxy radical, acyloxy radical, etc., or by the hydrolysis of one or two or more diorganohalosilanes.

The colloidal silica comprising component (B) may be either a fumed colloidal silica or a precipitated colloidal silica such as those stabilized by sodium, ammonia or aluminum ions and preferably with particle sizes of 0.0001 to 0.1 micrometers. The amount of colloidal silica used is from 1.0 to 150 parts by weight and preferably from 1.0 to 70 parts by weight per 100 parts by weight of the polydiorganosiloxane comprising component (A).

The alkali metal silicate is preferably used as the aqueous solution of a water-soluble silicate salt. Examples of the alkali metal silicate are lithium silicate, sodium silicate, potassium silicate and rubidium silicate. It is used at from 0.3 to 30 parts by weight and preferably from 0.3 to 20 parts by weight per 100 parts by weight of the polydiorganosiloxane comprising component (A).

The curing catalyst comprising component (C) is used to cure the composition of this invention. Examples are the metal salts of organic acids such as dibutyltin dilaurate, dibutyltin diacetate, tin octanoate, dibutyltin dioctoate, tin laurate, ferric stanooctanate, lead octanoate, lead laurate, zinc octanoate, tetrabutyl titanate and amino compounds and their hydrochlorides such as n-hexylamine and guanidine. These curing catalysts are preferably emulsified beforehand using a general emulsifier and water.

The quantity of curing catalyst used is from 0.01 to 10 parts by weight and preferably from 0.05 to 5 parts by weight per 100 parts by weight of polydiorganosiloxane comprising component (A).

The emulsifier comprising component (D) is used to emulsify the composition of the invention. It may be an anionic, nonionic or cationic emulsifier.

Examples of anionic emulsifiers are aliphatic acid salts, salts of sulfate esters of higher alcohols, alkylbenzenesulfonic acid, salts of alkylnaphthalenesulfonates, alkyl phosphoric acid and salts of sulfate esters of polyethylene glycol ethers. Examples of nonionic emulsifiers are polyoxyethylene alkylphenyl ethers, sorbitan aliphatic acid esters, polyoxyethylene sorbitan aliphatic acid esters, polyoxyalkyl esters, polyoxyethylenepolyoxypropylenes and aliphatic acid monoglycerides. Examples of cationic emulsifiers are aliphatic amine salts, quaternary ammonium salts, alkylpyridinium salts, etc. One or two or more of these emulsifiers can be used. The quantity of application is from 2 to 30 parts by weight per 100 parts by weight of polydiorganosiloxane comprising component (A).

The water comprising component (E) is used to emulsify the composition and its quantity is not restricted. It is preferred that the water be from 20 to 80 percent by weight of the base emulsion composition.

The amino-functional silane or its partial hydrolysis condensate comprising component (F) causes this composition to manifest gloss and rustproofness. It has the formula $(XR)_n Si(OR')_{4-n}$ where X is an amino-functional group such as an amino group, ethylamino group, n-butylamino group, cyclohexylamino group, phenylamino group, N-aminoethylamino group, or dimethylamino group; R is a divalent hydrocarbon radical containing no more than 8 carbon atoms such as methylene, ethylene, propylene, butylene, hexylene, phenylene, cyclohexylene, tolylene, or xylylene; R' is a monovalent hydrocarbon radical containing less than 7 carbon atoms or is selected from the group consisting of $-CH_2OC_2H_5$ or $-CH_2CH_2OCH_3$, such as methyl, ethyl, propyl, butyl, or ethoxymethoxy, and n is 1, 2, or 3. Practical examples are B-aminoethyltrimethoxysilane, gamma-aminopropyltriethoxysilane, N-aminoethyl-gamma-aminopropylmethyldimethoxysilane, and N-aminoethyl-gamma-aminopropyltriethoxysilane. The partial hydrolysis condensate of these compounds can also be used. Component (F) is used at from 0.5 to 30 parts by weight per 100 parts by weight of the polydiorganosiloxane comprising component (A).

To manufacture the silicone aqueous emulsion composition, a base emulsion composition composed of components (A), (B), (C), (D) and (E) is first prepared. Numerous well-known methods may be used for this preparation. For example, a hydroxyl group-terminated polydimethylsiloxane can be combined with the emulsifier comprising component (D) and the water comprising component (E) and then emulsified using an emulsifier such as a homomixer, homogenizer, colloid mill, etc., followed by adding and mixing the colloidal silica or alkali metal silicate comprising component (B) and the curing catalyst comprising component (C). In another example, a cyclic polydiorganosiloxane, such as octamethylcyclotetrasiloxane, is emulsified into water using an emulsifier. An already-known ring-opening catalyst is added to the emulsion of cyclic polydiorganosiloxane and an emulsion of a hydroxyl group-terminated polydiorganosiloxane is obtained by heating the mixture. A colloidal silica or alkali metal silicate as component (B) and a curing catalyst as component (C) are then mixed with the emulsion of a hydroxyl group-terminated polydiorganosiloxane. There is no specific restriction on these methods as long as the base emulsion composition is prepared from 100 parts by weight of the hydroxyl group-containing polydiorganosiloxane comprising component (A), from 1 to 150 parts by weight colloidal silica or from 0.3 to 30 parts by weight alkali metal silicate comprising component (B) curing catalyst comprising component (C), from 2 to 30 parts by weight of the emulsifier comprising component (D), and water comprising component (E). This base emulsion composition is then adjusted to pH 9 to 12. For example, amines such as diethylamine and ethylenediamine or alkali metal hydroxides such as sodium hydroxide, potassium hydroxide, etc., may be used for adjustment. This is followed by a particular ripening (aging period). Ripening is carried out at a temperature which does not damage the emulsion such as at 10° to 95° C. and preferably 15° to 50° C. The length of the period is determined by the condition that an elastomeric material is formed when water is removed from the base emulsion composition. In practice, this period is 1 week or more at 25° C. or 4 days or more at 40° C. An incomplete ripening results in gelation upon the addition of component (F). After ripening, the amino-functional silane or its hydrolyzate comprising component (F) is added and mixed in to produce the silicone aqueous emulsion composition.

The usual additives for ordinary water-base paints, e.g., thickeners, fillers, defoamers, pigments, dyes, preservatives, penetrating agents (such as aqueous ammonia), may be compounded into the silicone aqueous emulsion compositions produced by the method of this invention.

The silicone aqueous emulsion composition obtained as above has a superior stability at room temperature and cures at room temperature by the removal of water. Since in particular it becomes an elastomer with a superior surface gloss and rustproofness as well as an excellent adhesion for the base material with which it is in contact during the curing process, it can be widely used as a treatment agent for fiber, paper, etc.; or as a binder for inorganic materials such as glass fiber, asbestos, etc.; or as a coating material or caulking material for metals, concrete, wood, slate, etc.

Examples follow to explain this invention further. "Parts" in the examples denote "parts by weight."

EXAMPLE 1 the pH to 11 and this mixture was ripened at room temperature for 2 weeks to provide a ripened emulsion. An amino-functional silane as component (F) in the form of gamma-aminopropyltriethoxysilane, N-beta-aminoethyl-gamma-aminopropyltrimethoxysilane or N-beta-aminoethyl-gamma-aminopropyl(methyl)dimethoxysilane was added, as shown in Table I, to 100 parts by weight of the ripened emulsion.

For comparison, gamma-methacryloxypropyltrimethoxysilane or gamma-glycidoxypropyltrimethoxysilane were added instead of the amino-functional silane.

These aqueous emulsions were applied to iron test plates. The gloss, rustproofness and adhesion were evaluated as follows and the table reports the results. Gloss was measured according to JIS K5400.6.7, 60° specular gloss. Rustproofness was judged by observing the amount of rust present after treatment in a weatherometer for 1000, 2000, and 3000 hours. The adhesion was judged by peeling the rubbery coating material off the iron test plates using a spatula and scoring adhesion using the following categories: (1) for cohesive rupture of the rubbery material, (2) for peeling at the interface with considerable strength, and (3) for peeling at the interface with little strength.

| Example Number | This invention | | | | Comparison | | |
| --- | --- | --- | --- | --- | --- | --- | --- |
|  | 1 | 2 | 3 | 4 | 5 | 6 | 7 |
| Amino-Functionalsilane | | | | (Parts) | | | |
| gamma-aminopropyl-trimethoxysilane | 2 | — | — | — | — | — | — |
| N—beta-aminoethyl-gamma-aminopropyl-trimethoxysilane | — | 2 | — | — | — | — | — |
| N—beta-aminoethyl-gamma-aminopropyl-(methyl)dimethoxysilane | — | — | 2 | 8 | — | — | — |
| gamma-methacryloxy-propyltrimethoxysilane | — | — | — | — | — | 2 | — |
| gamma-glycidoxypropyl-trimethoxysilane | — | — | — | — | — | — | 2 |
| gloss | 65 | 65 | 65 | 80 | 5 | 10 | 10 |
| rustproofness: | | | | | | | |
| 1000 hours. | no rust | no rust | no rust | no rust | all rusted | partial rusting | partial rusting |
| 2000 hours | same as above | same as above | same as above | same as above | same as above | all rusted | all rusted |
| 3000 hours | same as above | same as above | same as above | same as above | same as above | same as above | same as above |
| adhesion | 1 | 1 | 1 | 1 | 3 | 3 | 2 |

An emulsion containing component (A) is obtained by mixing 2 parts sodium lauryl sulfate and 70 parts water with 100 parts of a hydroxyl group-terminated polydimethylsiloxane (30 siloxane repeat units) and passing this twice through a homogenizer under 150 kg/cm$^2$ followed by the addition of 1 part dodecylbenzenesulfonic acid as the polymerization initiator to carry out an emulsion polymerization at room temperature for 16 hours. This is then adjusted to pH 7 by adding aqueous sodium hydroxide to provide an emulsion (Emulsion A) containing a hydroxyl group-terminated polydimethylsiloxane with a molecular weight of approximately 200,000.

An emulsion containing component (C) (Emulsion C) was prepared by mixing 10 parts sodium lauryl sulfate and 40 parts water with 40 parts dioctyltin dilaurate and then passing this through the homogenizer.

A mixture was prepared from 100 parts Emulsion A, 1.5 parts Emulsion C and 25 parts aqueous silica containing 30 weight percent solids as component (B). A small amount of diethylamine was then added to adjust

EXAMPLE 2

A mixture was prepared from 1.5 parts Emulsion C and 3 parts sodium silicate added to 100 parts Emulsion A prepared as in Example 1, this was mixed to homogeneity, then adjusted to pH 10, and ripened at room temperature for 4 weeks. Then 5 parts N-beta-aminoethylaminopropyltrimethoxysilane were added to produce an aqueous emulsion. This was applied on a fluororesin film. After the removal of water, a 1 mm thick rubber sheet was obtained.

The surface of this rubber sheet has excellent gloss. Its measured properties were a hardness (JIS) of 70, an elongation of 280%, a tensile strength of 22 kg/cm$^2$ and a tear strength of 13 kg/cm$^2$.

This aqueous emulsion presented no change after storage for one year at room temperature.

That which is claimed:

1. A method for producing silicone aqueous emulsion composition consisting essentially of (1) adjusting a base emulsion composition which consists essentially of
   (A) 100 parts by weight of a polydiorganosiloxane which contains at least 2 silicon-bonded hydroxyl groups per molecule, the organic groups being monovalent halogenated hydrocarbon radicals or monovalent hydrocarbon radicals,
   (B) from 1 to 150 parts by weight colloidal silica or from 0.3 to 30 parts by weight alkali metal silicate,
   (C) from 0.01 to 10 parts by weight of a curing catalyst, said catalyst being a metal salt of an organic acid,
   (D) from 2 to 30 parts by weight emulsifier, and
   (E) water to a pH of from 9 to 12,
(2) ripening at a temperature of from 10° to 95° C. for a sufficient period of time that an elastomeric material will be formed when water is removed at room temperature, and
(3) adding
   (F) from 0.5 to 30 parts by weight of an amino-functional silane of the formula

where X is an amino-functional radical, R is a divalent hydrocarbon radical containing no more than 8 carbon atoms, R' is a monovalent hydrocarbon radical containing less than 7 carbon atoms or is selected from the group consisting of —CH$_2$OC$_2$H$_5$ or —CH$_2$CH$_2$OCH$_3$, and n is 1, 2, or 3 or its partial hydrolysis condensate.

2. The method of claim 1 in which (A) is a polydimethylsiloxane having a molecular weight of greater than 50,000, (B) is from 1 to 70 parts by weight of colloidal silica, (C) is from 0.01 to 10 parts by weight of a dialkyltindicarboxylate, (D) is an anionic emulsifier, and (F) is an amino-functional silane where n is 1 or 2.

3. The method of claim 1 in which the adjusting step (1) consists essentially of admixing an amine.

4. The method of claim 1 in which the adjusting step (1) consists essentially of admixing alkali metal hydroxide.

5. The method of claim 4 in which the alkali metal hydroxide is sodium hydroxide.

6. The method of claim 1 in which the ripening is carried out at a temperature of from 15° to 50° C.

* * * * *